(12) United States Patent
Bayesteh et al.

(10) Patent No.: US 10,784,984 B2
(45) Date of Patent: *Sep. 22, 2020

(54) SYSTEMS AND METHODS FOR WAVEFORM SELECTION AND ADAPTATION

(71) Applicant: Huawei Technologies Co., Ltd., Shenzhen (CN)

(72) Inventors: Alireza Bayesteh, Ottawa (CA); Hosein Nikopour, San Jose, CA (US); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,085

(22) Filed: Jun. 22, 2017

(65) Prior Publication Data

US 2017/0310419 A1   Oct. 26, 2017

Related U.S. Application Data

(63) Continuation of application No. 13/688,926, filed on Nov. 29, 2012, now Pat. No. 9,692,550.

(51) Int. Cl.
*H04L 1/00* (2006.01)
*H04W 72/02* (2009.01)
(Continued)

(52) U.S. Cl.
CPC .......... *H04L 1/0001* (2013.01); *H04W 72/02* (2013.01); *H04W 72/048* (2013.01); *H04W 72/0413* (2013.01); *H04W 88/02* (2013.01)

(58) Field of Classification Search
CPC ......... H04L 1/0003; H04L 2025/03414; H04L 27/2601; H04L 1/0001; H04W 88/06;
(Continued)

(56) References Cited

U.S. PATENT DOCUMENTS 6,385,434 B1 * 5/2002 Chuprun ............... H04W 16/10
455/11.1
7,020,177 B2 * 3/2006 Leeper ................. H04B 1/7172
370/335
(Continued)

FOREIGN PATENT DOCUMENTS

CN          1753343 A      3/2006
CN        101112005 A      1/2008
(Continued)

OTHER PUBLICATIONS

Wang, P., et al., "Comparison of Orthogonal and Non-Orthogonal Approaches to Future Wireless Cellular Systems," Vehicular Technology Magazine, IEEE vol. 1, Issue 3, Sep. 2006, pp. 4-11.

*Primary Examiner* — Will W Lin
(74) *Attorney, Agent, or Firm* — Slater Matsil, LLP

(57) ABSTRACT

Systems, methods, and apparatuses for providing waveform adaptation are provided. In an example, a method is provided for identifying a plurality of candidate waveforms, and selecting one of the candidate waveforms for data transmission. The candidate waveforms may be identified in accordance with one or more criteria, such as a transmission capability of the transmitting device, a reception capability of the receiving device, a desired Peak-to-Average-Power-Ratio (PAPR) characteristic, adjacent channel interference (ACI) rejection requirements, spectrum localization requirements, and other criteria. The waveform selected for data transmission may be selected in accordance with one or more waveform selection criteria, such as traffic characteristic, application types, etc.

37 Claims, 6 Drawing Sheets

(51) Int. Cl.
*H04W 72/04* (2009.01)
*H04W 88/02* (2009.01)

(58) Field of Classification Search
CPC ............... H04W 48/18; H04W 72/048; H04W 72/0413; H04W 72/02; H04W 88/02; H04B 1/50; H04B 7/0452
See application file for complete search history.

(56) References Cited

U.S. PATENT DOCUMENTS

| | | | |
|---|---|---|---|
| 7,606,713 B2 | 10/2009 | Thorner | |
| 7,714,643 B1* | 5/2010 | Wang | H03H 11/1291 327/552 |
| 8,249,591 B2 | 8/2012 | Tod et al. | |
| 8,682,331 B2 | 3/2014 | Nagaraja et al. | |
| 8,897,394 B1* | 11/2014 | Nabar | H04L 27/261 375/260 |
| 8,914,034 B2 | 12/2014 | Hu et al. | |
| 8,977,303 B2 | 3/2015 | Fang et al. | |
| 9,271,290 B2* | 2/2016 | Pelletier | H04W 88/06 |
| 2003/0147358 A1* | 8/2003 | Hiramatsu | H04L 27/364 370/281 |
| 2004/0179494 A1 | 9/2004 | Attar et al. | |
| 2006/0050799 A1 | 3/2006 | Hou et al. | |
| 2006/0063543 A1 | 3/2006 | Matoba et al. | |
| 2006/0133522 A1 | 6/2006 | Sutivong et al. | |
| 2006/0203845 A1* | 9/2006 | Monogioudis | H04B 7/2618 370/466 |
| 2007/0081604 A1 | 4/2007 | Khan et al. | |
| 2008/0013476 A1* | 1/2008 | Vasudevan | H04L 5/023 370/328 |
| 2008/0291821 A1 | 11/2008 | Dent | |
| 2009/0120636 A1* | 5/2009 | Summerfield | G01V 3/083 166/250.16 |
| 2009/0201869 A1 | 8/2009 | Xu et al. | |
| 2009/0201872 A1 | 8/2009 | Gorokhov et al. | |
| 2009/0252099 A1* | 10/2009 | Black | H04L 25/03343 370/329 |
| 2010/0067591 A1 | 3/2010 | Luo et al. | |
| 2010/0202349 A1 | 8/2010 | Guan | |
| 2010/0290544 A1 | 11/2010 | Kawamura et al. | |
| 2011/0116383 A1 | 5/2011 | Lipka | |
| 2011/0200129 A1* | 8/2011 | Hwang | H04L 27/2621 375/260 |
| 2011/0255412 A1 | 10/2011 | Ngai | |
| 2011/0273999 A1 | 11/2011 | Nagaraja | |
| 2012/0140743 A1* | 6/2012 | Pelletier | H04W 76/15 370/335 |
| 2012/0184327 A1* | 7/2012 | Love | H04W 52/267 455/552.1 |
| 2012/0195216 A1* | 8/2012 | Wu | H04W 72/0486 370/252 |
| 2012/0208534 A1* | 8/2012 | Swaminathan | H04W 8/183 455/434 |
| 2012/0300752 A1 | 11/2012 | Kwon et al. | |
| 2012/0320829 A1* | 12/2012 | Onishi | H04L 1/1832 370/328 |
| 2013/0028069 A1* | 1/2013 | Pelletier | H04W 40/248 370/216 |
| 2013/0058315 A1 | 3/2013 | Feuersänger et al. | |
| 2013/0194917 A1 | 8/2013 | Melsen et al. | |
| 2013/0201850 A1 | 8/2013 | Swaminathan et al. | |
| 2013/0242965 A1* | 9/2013 | Horn | H04W 88/10 370/338 |
| 2013/0244656 A1 | 9/2013 | Heo et al. | |
| 2013/0279632 A1* | 10/2013 | Kim | H04L 27/20 375/302 |
| 2014/0003301 A1 | 1/2014 | Madan et al. | |
| 2014/0029586 A1 | 1/2014 | Loehr et al. | |
| 2014/0064068 A1* | 3/2014 | Horn | H04W 28/0289 370/230 |
| 2014/0086172 A1 | 3/2014 | Kwon et al. | |
| 2015/0156764 A1 | 6/2015 | Yang et al. | |
| 2019/0028980 A1* | 1/2019 | Feuersaenger | H04W 52/327 |

FOREIGN PATENT DOCUMENTS

| | | |
|---|---|---|
| CN | 101385271 A | 3/2009 |
| CN | 101438611 A | 5/2009 |
| CN | 101491049 A | 7/2009 |
| CN | 101926139 A | 12/2010 |
| CN | 102047732 A | 5/2011 |
| CN | 102150387 A | 8/2011 |
| EP | 1701458 A2 | 9/2006 |
| EP | 1998586 A1 | 12/2008 |
| EP | 2259632 A1 | 12/2010 |
| WO | 2005015775 A1 | 2/2005 |

* cited by examiner

SYSTEMS AND METHODS FOR WAVEFORM SELECTION AND ADAPTATION

This application is a continuation of Non-Provisional patent application Ser. No. 13/688,926 filed on Nov. 29, 2012 and entitled "Systems and Methods for Waveform Selection and Adaptation," which is incorporated by reference herein as if reproduced in its entirety.

TECHNICAL FIELD

The present invention relates generally to wireless communications, and, in particular embodiments, to techniques for selecting waveforms for carrying wireless signals.

BACKGROUND

In modern wireless networks, a single waveform type is generally used for uplink communications, as well as downlink communications. For instance, fourth generation (4G) long term evolution (LTE) networks utilize an orthogonal frequency division multiple access (OFDMA) waveform for downlink communications and a single-carrier frequency division multiple access (SC-FMDA) waveform for uplink communications. Conversely, 4G Evolved High-Speed Downlink Packet Access (HSDPA+) networks utilize a code division multiple access (CDMA) waveform for both uplink and downlink communications. Because each waveform has its own advantages/disadvantages, no single waveform is optimal for all applications. As such, the performance of conventional wireless networks is limited by virtue of using a single waveform.

SUMMARY OF THE INVENTION

Technical advantages are generally achieved by preferred embodiments of the present invention which describe systems and methods for waveform selection and adaptation.

In accordance with an embodiment, method of waveform adaptation is provided. In this example, the method includes establishing a wireless link extending between a transmitting device and a receiving device, identifying a plurality of candidate waveforms for transporting traffic over the wireless link, selecting one of the plurality of candidate waveforms in accordance with a waveform selection criteria, and communicating the traffic over the wireless link using the selected candidate waveform. Apparatuses for transmitting and receiving the traffic in accordance with this method are also provided.

In accordance with another embodiment, another method of waveform adaptation is provided. In this example, the method includes receiving a grant request from a transmit point. The grant request requests resources for communicating traffic in a channel of a wireless network. The method further includes establishing a wireless link in the channel, identifying a plurality of candidate waveforms in accordance with a capability of the transmit point, selecting one of the plurality of candidate waveforms in accordance with a traffic characteristic of the traffic, sending a grant response that identifies the selected candidate waveform, and receiving a transmission carried by the selected waveform from the transmit point. The transmission includes the traffic. An apparatus for performing this method is also provided.

In accordance with yet another embodiment, another method of waveform adaptation is provided. The method includes receiving a first data transmission in accordance with a first waveform type via a channel, and receiving a second data transmission in accordance with a second waveform type via the channel. The second waveform type is different than the first waveform type, and first data transmission is received over different time-frequency resources of the channel than the first data transmission. Both the first data transmission and the second data transmission comprise at least some data that is not classified as signaling or control information. An apparatus for performing this method is also provided.

In accordance with yet another embodiment, another method of waveform adaptation is provided. In this example, the method includes transmitting a first data transmission using a first waveform type in a channel, and transmitting a second data transmission using a second waveform type in the channel. The second waveform type is different than the first waveform type, and the second data transmission is transmitted over different resources of the channel than the first data transmission. The first data transmission and the second data transmission comprise at least some data that is not classified as signaling or control information. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

As discussed above, conventional wireless networks use a single, statically selected, waveform throughout the life of the network. However, no single waveform is ideal for all conditions/situations. By way of example, OFDMA waveforms exhibit comparatively high scheduling gain by virtue of frequency selective scheduling (FSS), which allows OFDMA waveforms to outperform interleaved frequency division multiple access (IFDMA) waveforms when wireless channel conditions are good. By comparison, IFDMA waveforms can exhibit comparatively less out-of-band (OOB) interference by virtue of their low Peak-to-Average-Power-Ratio (PAPR) characteristics, which allows IFDMA waveforms to be able to outperform OFDMA waveforms when wireless channel conditions are poor. Other categories of waveforms also exhibit advantages and disadvantages. For instance, non-orthogonal waveforms provide higher throughput, while orthogonal waveforms require less processing/computational capacity (making them less burdensome to transmit and receive). As a consequence of using a single, statically-selected, waveform, conventional wireless networks are unable to adjust to changes in network conditions (e.g., transmission and reception condition, traffic load, latency requirements, etc.), thereby leading to inefficiencies and reduced performance. Accordingly, a mechanism for waveform adaptation is desired.

Aspects of this disclosure provide a mechanism for adapting between various waveforms in accordance with network conditions and/or traffic requirements, as well as an architecture for supporting multiple waveforms concurrently in a single downstream or upstream channel. In an embodiment, waveform adaptation includes identifying a plurality of candidate waveforms in accordance with a UE's and/or transmit point (TP) capability, and thereafter selecting one of the candidate waveforms for data transmission in accordance with a traffic characteristic or a network condition. In embodiments, different waveforms may coexist in a single upstream or downstream channel by scheduling, or otherwise reserving, different time-frequency resources (e.g., frequency bands, timeslots, etc.) for different waveforms.

Figure 1:
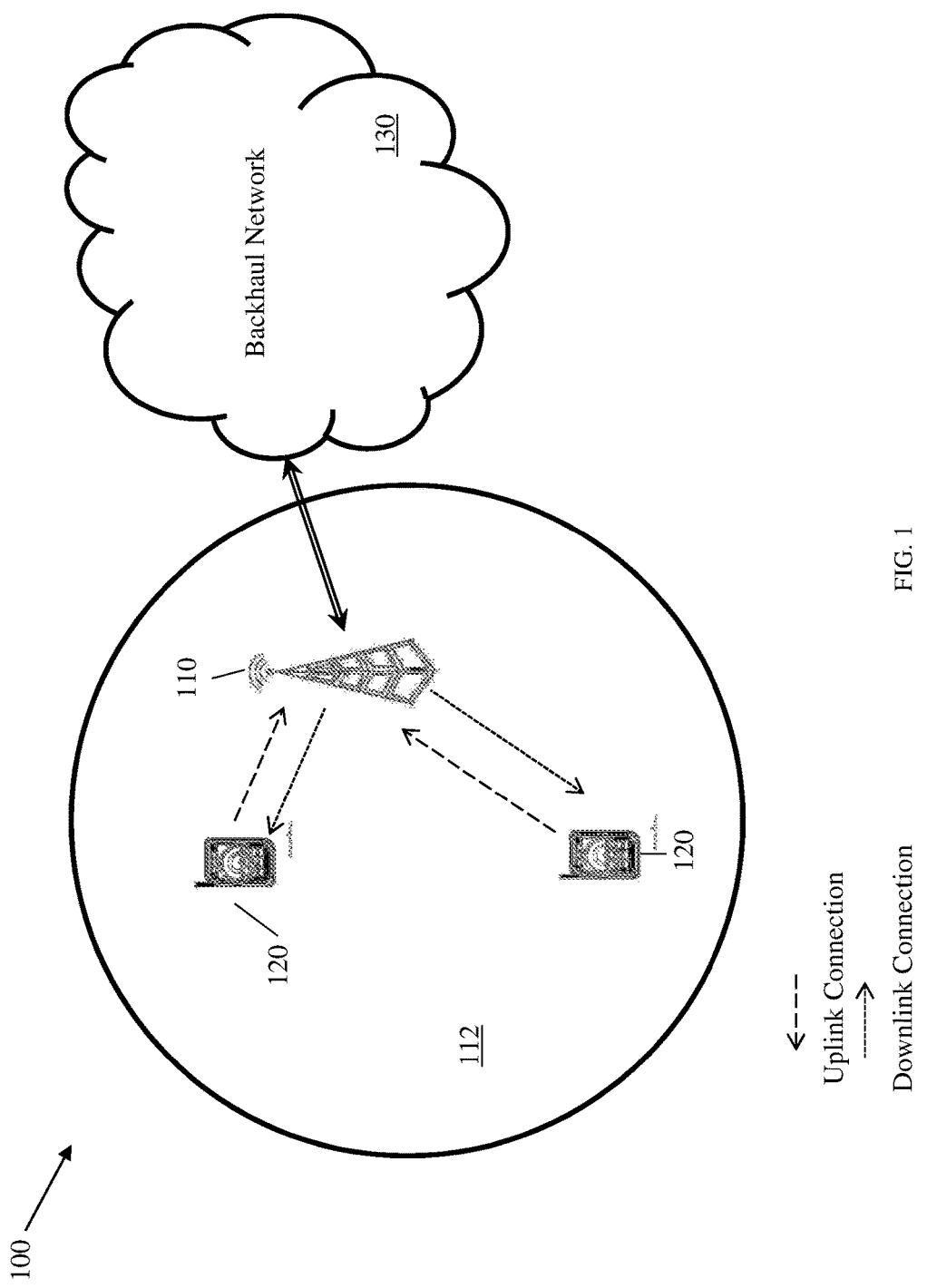
FIG. 1 illustrates a diagram of a communications network.

FIG. 1 illustrates a network 100 for communicating data. The network 100 comprises a transmit point (TP) 110 having a coverage area 112, a plurality of user equipments (UEs) 120, and a backhaul network 130. As discussed herein, the term transmit point (TP) may refer to any device used to transmit a wireless signal to another device, including a UE, a base station, an enhanced base station (eNB), a femtocell, etc. For instance, TPs may be a UE in an uplink communication or a device-to-device (D2D) communication. The TP 110 may be any component capable of providing wireless access to the UEs 120-125. The TP 110 may provide wireless access by, inter alia, establishing an uplink connection (dashed line) and/or a downlink connection (dotted line) with the UEs 120-125. The UEs 120-125 may be any component or collection of components that allow a user to establish a wireless connection for purposes of accessing a network, e.g., the backhaul network 130. The backhaul network 130 may be any component or collection of components that allow data to be exchanged between the TP 110 and a remote end (not shown). In some embodiments, the network 100 may comprise various other wireless devices, such as relays, femtocells, etc.

Figure 2:
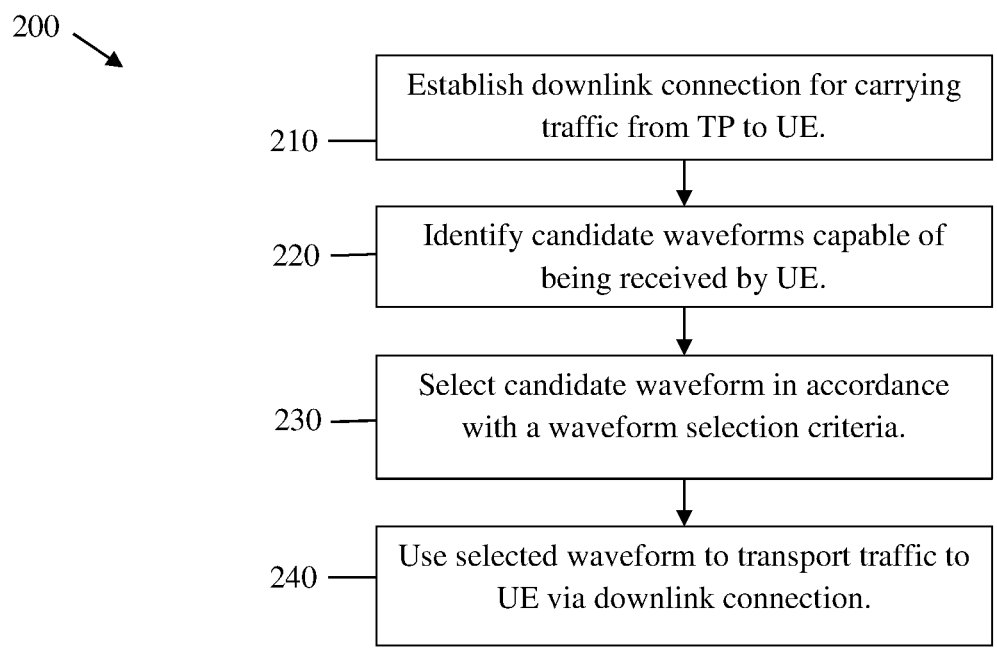
FIG. 2 illustrates an embodiment of a method for performing waveform adaptation.

FIG. 2 illustrates an embodiment of a method 200 for performing waveform adaptation over a downlink connection. The method 200 begins at step 210, where a downlink connection is established for carrying traffic from the TP to the UE. Next, the method 200 proceeds to step 220, where a plurality of candidate waveforms are identified in accordance with a reception and/or processing capability of the UE. In some embodiments, the processing capability of the UE corresponds to an ability (or inability) to perform complex computation techniques, as may be required to process, inter alia, non-orthogonal waveforms. In embodiments, the step 220 may also consider the transmission and/or processing capabilities of the TP. Next, the method 200 proceeds to step 230, where one of the candidate waveforms is selected in accordance with a waveform selection criteria. In an embodiment, the waveform selection criteria may include a traffic characteristic and/or an application type. In the same or other embodiments the waveform selection criteria may include an adjacent channel interference (ACI) rejection requirement and/or a spectrum localization requirement. Adjacent-channel interference (ACI) is interference caused by extraneous power from a signal in an adjacent channel. Depending on the application scenario, different level of ACI rejection may be needed. For example, to make use of some gaps between two occupied spectrums, the transmitter which transmits over the gap should not cause extra emission to the existing spectrum and therefore should better restrict the out-of-band emissions. Different waveforms may have different spectrum location feature. Spectrum localization may refer to the propensity of a waveform to generate interference in neighboring frequency bands, and may be a consideration in applications (e.g., cognitive radio) that have require low inter-channel interference. In some embodiments, the traffic characteristic relates to a latency, QoS, or reliability constraint associated with a traffic type of the data to be transmitted. For example, if the traffic type requires low-latency (e.g., mobile gaming), then a waveform offering grant-less access (e.g., CDMA) may be selected. Alternatively, if the traffic type requires high reliability or high-bandwidth (e.g., transactional traffic, video, etc.), then a waveform offering grant-based access (e.g., non-CDMA, etc.) may be selected. As discussed herein, waveforms offering grant-less access do not require the transmit point to communicate/signal grant information to the receiving device prior to transmitting the data, while waveforms offering grant-based access require the transmit point to communicate/signal grant information to the receiving device prior to transmitting the data. For instance, a contention-based access channel (e.g., a random access channel) may be grant-less, while a TDMA channel may be grant-based. After selecting the waveform, the method 200 proceeds to step 240, where selected waveform is used to transport traffic to the UE via the downlink connection. Although the method 200 can be implemented by any network component at any time, it may typically be performed by the TP upon receiving downlink data (e.g., data destined for the UE) from the backhaul network or another UE.

Figure 3:
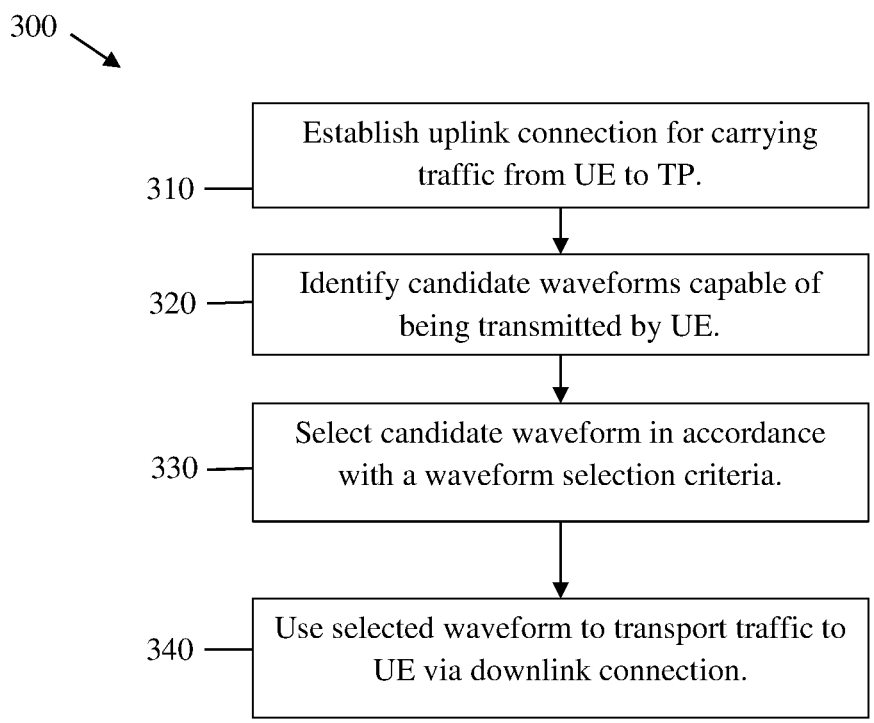
FIG. 3 illustrates another embodiment of a method for performing waveform adaptation.

FIG. 3 illustrates an embodiment of a method 300 for performing waveform adaptation over an uplink connection. The method 300 begins at step 310, where an uplink connection is established for carrying traffic from the UE to the TP. Next, the method 300 proceeds to step 320, where a plurality of candidate waveforms are identified in accordance with a transmission and/or processing capability of the UE. In embodiments, the step 320 may also consider the reception and/or processing capabilities of the TP. Next, the method 300 proceeds to step 330, where one of the candidate waveforms is selected in accordance with a waveform selection criteria. In an embodiment, the waveform selection criteria may include a traffic characteristic and/or an application type. In the same or other embodiments the waveform selection criteria may include an ACI rejection requirement and/or a spectrum localization requirement. Although the method 300 can be implemented by any network component at any time, it may typically be performed either by the TP upon (e.g., upon receiving an uplink grant request from the UE) or by the UE (e.g., before sending an uplink grant request to the TP). In some embodiments, the UE may be preconfigured to send data of a certain type (e.g., low-latency, low-load traffic, etc.) over a frequency sub-band reserved for grant-less waveforms, thereby avoiding the overhead associated with uplink grant requests.

Figure 4:
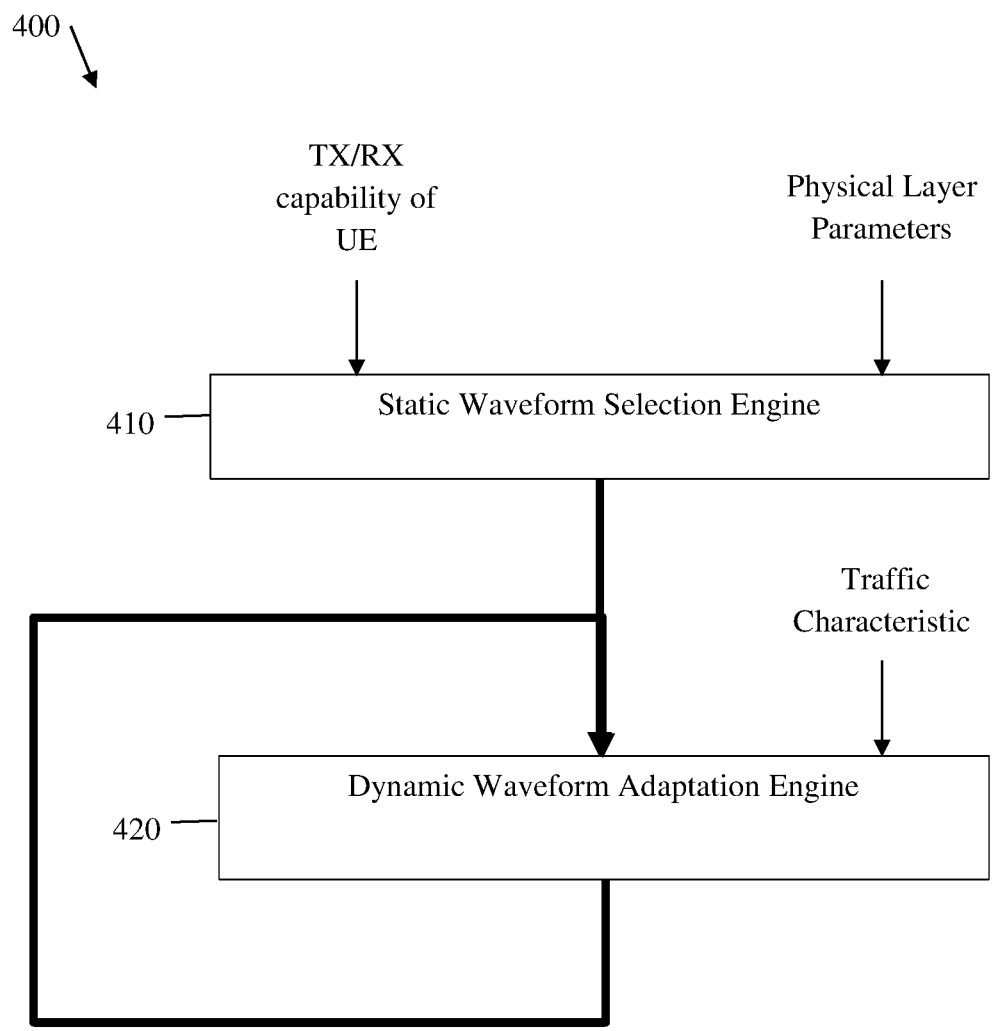
FIG. 4 illustrates a diagram of a component for performing multi-stage waveform adaptation.

FIG. 4 illustrates a high-level diagram of a component 400 for performing multi-stage waveform adaptation. The component 400 comprises a static waveform adaptation engine 410 and a dynamic waveform adaptation 420. The static waveform adaptation engine 410 is configured to perform a first stage of waveform adaptation to identify a plurality of candidate waveforms. In an embodiment, the candidate waveforms may be identified in accordance with a transmission or reception (TX/RX) capability of the UE as well as physical layer parameters (e.g., PAPR, etc.). The dynamic waveform selection engine 420 is configured to perform a second stage of waveform adaptation by selecting one of the plurality of identified candidate waveforms for data transmission. In an embodiment, the dynamic waveform selection engine may select the candidate waveform in accordance with a traffic characteristic or application type. In some embodiments, the static waveform selection 410 may execute the first stage of waveform adaption once (e.g., upon formation of the uplink/downlink connection between the TP and/or UE), while the dynamic waveform selection engine 420 may be configured to perform the second stage of waveform adaption repeatedly (e.g., on a periodic basis). In such embodiment, the waveform may be adapted dynamically in accordance with changing traffic characteristics and/or network conditions. The dynamic waveform selection engine 420 may also physical layer parameters (e.g., PAPR, etc.), particularly during subsequent iterations so as to account for changes in wireless channel conditions.

Figure 5:
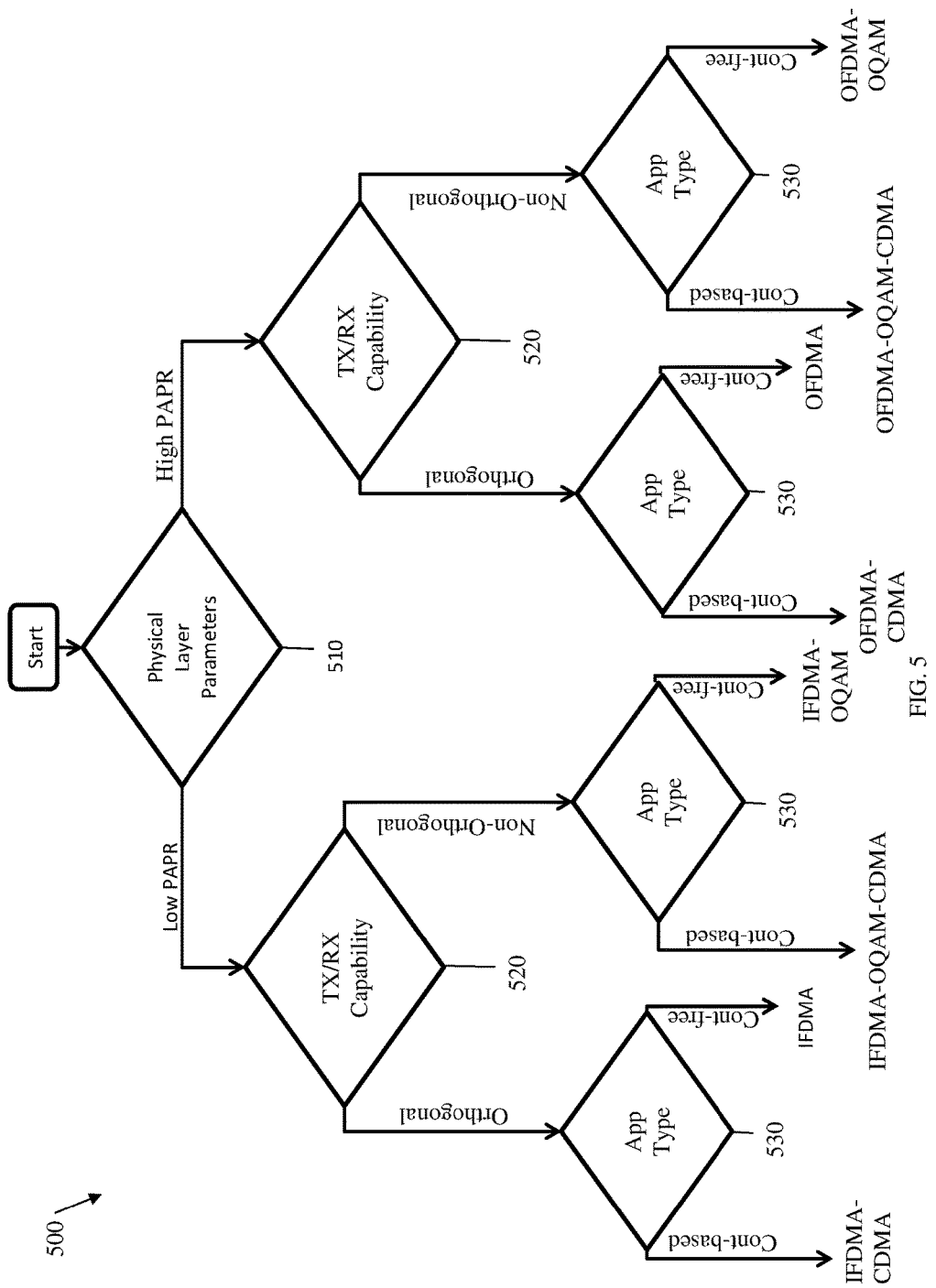
FIG. 5 illustrates another embodiment of a method for performing waveform adaptation.

FIG. 5 illustrates an embodiment of a method 500 for adaptive waveform selection. The method 500 begins at step 510, where physical layer parameters and/or the TP's Peak-to-Average Power Ratio (PAPR) tolerance are evaluated to determine whether a high or low PAPR waveform is desired. Notably, PAPR tolerance may correspond to a pulse shaping capability of the transmitting device, and may be related to radio frequency power amplifier performance, e.g., linearity, etc. Additionally, PAPR is a characteristic which significantly affects a waveform's propensity for generating interference in adjacent channels. Specifically, high PAPR waveforms (e.g., OFDMA, etc.) tend to exhibit higher out-of-band interference than low PAPR waveforms (e.g., interleaved frequency division multiple access (IFDMA), etc.), particularly as transmit power is increased. Consequently, high PAPR waveforms may produce higher bit error rates in adjacent frequency sub-bands for high transmit-power data transmission (e.g., when channel gain is low), thereby resulting in lower network throughput. The tendency for high PAPR waveforms to produce or exhibit higher out-of-band interference is primarily attributable to power amplifier non-linearity. Even so, high PAPR waveforms (e.g., OFDMA, etc.) generally provide better spectral efficiency than low PAPR waveforms (e.g., IFDMA, etc.).

The method 500 then proceeds to step 520, where the UE's TX/RX capabilities are evaluated to determine whether an orthogonal or non-orthogonal waveform is desired. Notably, the TP's TX/RX capabilities may also be considered. However, from a practical standpoint, it may typically be the TX/RX capabilities of the mobile device that limit waveform selection. The TX/RX capabilities may correspond to the UE's ability to perform complex processing techniques, as may typically be required of non-orthogonal waveforms. Notably, the UE's ability to perform complex processing techniques (e.g., equalization for interference cancellation, MIMO detection, channel estimation to make up for lack of cyclic prefix), etc.) may enable the use of waveforms that rely on advanced modulation techniques. Thereafter, the method 500 proceeds to step 530, where the application type is evaluated to determine whether a grant-less or a grant-based waveform is desired. A grant-less waveform (e.g., CDMA, etc.) may be selected if, for example, an application or traffic type has a low latency requirement, so as to avoid scheduling-related latency. Likewise, a grant-less waveform may be selected when there is a relatively small amount of data to transmit, so as to avoid the scheduling-related overhead. Alternatively, a grant-based waveform (e.g., non-CDMA, etc.) may be selected if, for example, an application or traffic type has a high reliability requirement, to reduce packet-error rates, or when there is a relatively large amount of data to transmit, to avoid having to re-transmit large amounts of data.

In some embodiments, the steps 510-520 may be performed during a first stage of waveform selection (e.g., during static waveform selection), while the step 530 may be performed during a second stage of waveform selection (e.g., during dynamic waveform selection). Depending on the outcome of the steps 510-530, one of a pool of possible waveforms will be chosen for data transmission. In an embodiment, static waveform selection may be performed once (e.g., upon identifying the wireless link for transmission), while dynamic waveform selection may be performed periodically or semi-periodically in accordance with a dynamic waveform adaptation period. The pool of possible waveforms may include any waveform that is capable of carrying a wireless transmission, including, but not limited to, IFDMA, OFDMA, CDMA, OQAM, and their derivatives (e.g., IFDMA-CDMA, IFDMA-OQMA, OFDMA-CDMA, etc.). Each waveform in the pool of possible waveforms may have their own distinct advantages and/or disadvantages. By way of example, OFDMA exhibits high PAPR and high scheduling gain through frequency selective scheduling (FSS), while IFDMA, by comparison, exhibits low PAPR and low frequency diversity. By way of another example, pre-coded OFDM (e.g., single carrier (SC)-FDMA, etc.) exhibits mid-to-low PAPR and low frequency diversity, while OFDM-CDMA exhibits high PAPR, scheduling-flexibility, and interference whitening for better link adaptation. Further still, various waveforms within the same class may exhibit different characteristics. For instance, some non-orthogonal waveforms (e.g., OFDM-OQAM) may exhibit lower OBB interference than other non-orthogonal waveforms due to better frequency localization. As another example, OFDMA-QQAM may be pre-coded to achieve lower PAPR, or combined with CDMA to achieve contention based access.

When data originates from a single TP, multiple waveforms can co-exist in a single channel (downlink, uplink, or otherwise) by assigning different waveforms to carry different traffic streams (different data-transmissions). By way of example, a single TP may simultaneously transmit a video signal via a grant-based waveform, and transmit a short message service (SMS) message via a grant-less waveform.

Multiple waveforms can also co-exist in a single channel (downlink, uplink, or otherwise) when the data originates from multiple TPs (or a single TP) by scheduling different waveforms to different time-frequency resources (e.g., frequency bands, time-slots/frames, etc.). This scheduling may be performed in a static, semi-static, or dynamic fashion. In one example, some frequency bands may be reserved for one category of waveforms (e.g., grant-less, orthogonal, etc.), while other frequency bands may be reserved for other categories of waveforms (e.g., grant-based, non-orthogonal, etc.). For instance orthogonal and non-orthogonal waveforms may be communicated in different frequency bands, with the frequency band scheduling/assignment being performed statically, semi-statically, or dynamically. Waveform segregation can also be achieved in the spatial domain, for instance, by using a grant-less waveform for beam targeting at the cell-edge and a grant-based waveform for beam targeting at the cell center. Low and high PAPR waveforms can coexist over any dimension.

Figure 6:
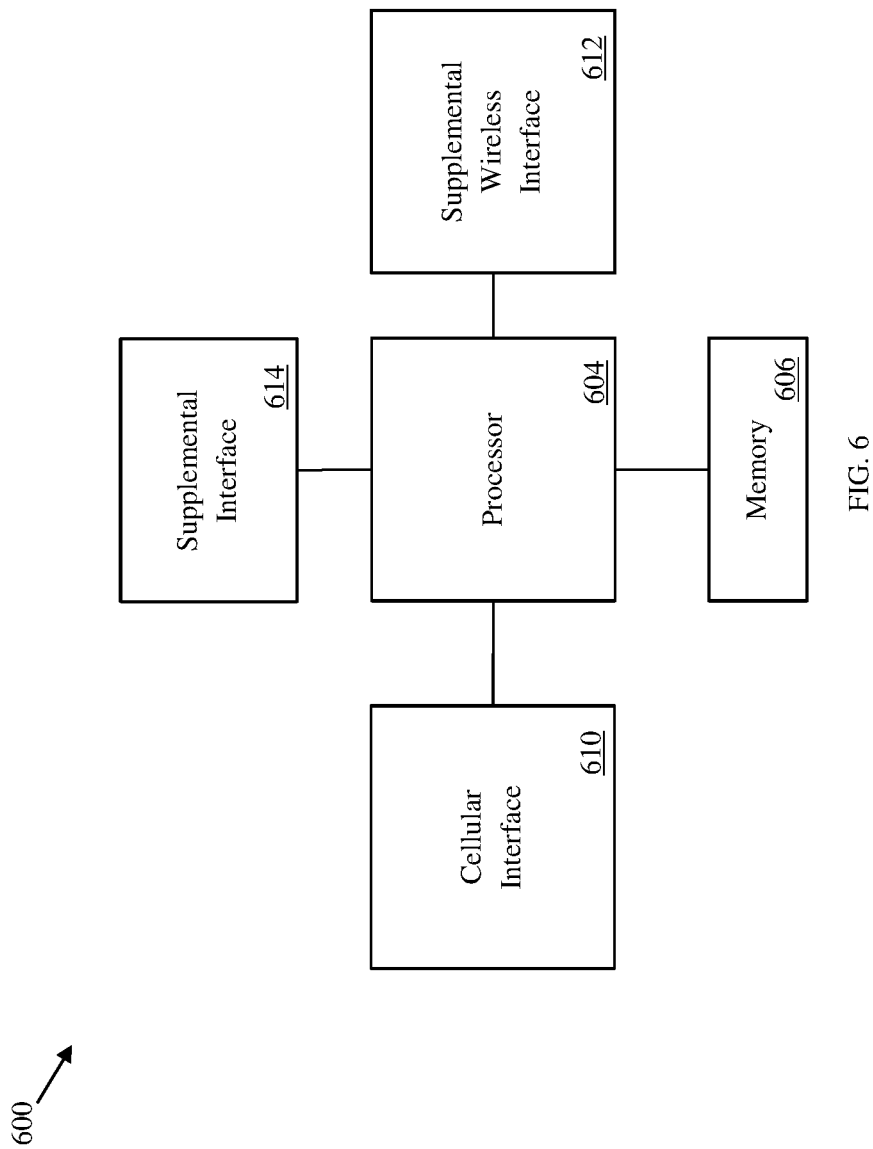
FIG. 6 illustrates a diagram of an embodiment of a communications device.

FIG. 6 illustrates a block diagram of an embodiment of a communications device 600, which may be implemented as one or more devices (e.g., UEs, TPs, etc.) discussed above. The communications device 600 may include a processor 604, a memory 606, a cellular interface 610, a supplemental wireless interface 612, and a supplemental interface 614, which may (or may not) be arranged as shown in FIG. 6. The processor 604 may be any component capable of performing computations and/or other processing related tasks, and the memory 606 may be transient or non-transient and may be any component capable of storing programming and/or instructions for the processor 604. The cellular interface 610 may be any component or collection of components that allows the communications device 600 to communicate using a cellular signal, and may be used to receive and/or transmit information over a cellular connection of a cellular network. The supplemental wireless interface 612 may be any component or collection of components that allows the communications device 600 to communicate via a non-cellular wireless protocol, such as a Wi-Fi or Bluetooth protocol, or a control protocol. The supplemental interface 614 may be component or collection of components that allows the communications device 600 to communicate via a supplemental protocol, including wire-line protocols. In embodiments, the supplemental interface 614 may allow the device 600 to communicate with a backhaul network.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The following examples are supported and enabled by this patent application.

1. A method of waveform adaptation, the method includes: establishing a wireless link between a transmitting device and a receiving device; identifying a plurality of candidate waveforms for transporting traffic over the wireless link; selecting one of the plurality of candidate waveforms in accordance with a waveform selection criteria; and communicating the traffic over the wireless link using the selected candidate waveform.

2. The method of example 1, wherein identifying the plurality of candidate waveforms comprises identifying candidate waveforms, out of a plurality of possible waveforms, that are both capable of being transmitted by the transmitting device and capable of being received by the receiving device.

3. The method of example 1, wherein identifying the plurality of candidate waveforms is performed statically upon identifying the wireless link, and wherein selecting one of the plurality of candidate waveforms in accordance with a waveform selection criteria is performed dynamically in accordance with a dynamic waveform adaptation period.

4. The method of example 1, wherein identifying the plurality of candidate waveforms comprises: determining whether the receiving device is capable of non-orthogonal signal processing; identifying at least some non-orthogonal waveforms as candidate waveforms if the receiving device is capable of non-orthogonal signal processing; and identifying only orthogonal waveforms as candidate waveforms if the receiving device is incapable of non-orthogonal signal processing.

5. The method of example 1, wherein identifying the plurality of candidate waveforms comprises: determining a Peak-to-Average-Power-Ratio (PAPR) tolerance of the transmitting device; and identifying candidate waveforms, out of a plurality of possible waveforms, having PAPR characteristics within the PAPR tolerance of the transmitting device, wherein waveforms having PAPR characteristics beyond the PAPR tolerance of the transmitting device are excluded from the plurality of candidate waveforms.

6. The method of example 1, wherein the waveform selection criteria includes a traffic characteristic of the traffic or an application type of the traffic.

7. The method of example 6, wherein selecting one of the plurality of candidate waveforms comprises: determining, in accordance with the traffic characteristic or the application type, whether grant-based access or grant-less access is better suited for transporting the traffic; selecting one of the plurality of candidate waveforms that offers grant-less access in response to determining that grant-less access is better suited for transporting the traffic; and selecting one of the plurality of candidate waveforms that offers grant-based access in response to determining that grant-based access is better suited for transporting the traffic.

8. The method of example 7, wherein waveforms offering grant-based access require that scheduling information be communicated to the receiving device before communicating the traffic over the wireless link, and wherein waveforms offering grant-less access do not require that scheduling information be communicated to the receiving device before communicating the traffic over the wireless link.

9. The method of example 7, wherein the traffic characteristic comprises a quality of service requirement of the traffic.

10. The method of example 7, wherein the traffic characteristic comprises a latency constraint of the traffic.

11. The method of example 7, wherein the traffic characteristic comprises a traffic load of the traffic.

12. The method of example 1, wherein the waveform selection criteria includes a spectrum localization requirement.

13. The method of example 1, wherein the waveform selection criteria includes an adjacent channel interference rejection requirement.

14. A transmit point in a wireless network, the transmit point includes: a processor; and a computer readable storage medium storing programming for execution by the processor, the programming including instructions to: establish a wireless link in a channel of the wireless network for transporting traffic to a receiving device; identify a plurality of candidate waveforms in accordance with at least one of a capability of the receiving device and a transmission capability of the transmit point; select one of the plurality of candidate waveforms in accordance with a waveform selection criteria; and perform a transmission in accordance with the selected candidate waveform, the transmission carrying the traffic to the receiving device via the wireless link.

15. The transmit point of example 14, wherein the instruction to identify the plurality of candidate waveforms includes instructions to: determine whether the receiving device is capable of non-orthogonal signal processing; identify at least some non-orthogonal waveforms as candidate waveforms if the receiving device is capable of non-orthogonal signal processing; and identify only orthogonal waveforms as candidate waveforms if the receiving device is incapable of non-orthogonal signal processing.

16. The transmit point of example 14, wherein the instruction to identify the plurality of candidate waveforms includes instructions to: determine a Peak-to-Average-Power-Ratio (PAPR) tolerance of the transmit point; and identify candidate waveforms, out of a plurality of possible waveforms, having PAPR characteristics within the PAPR tolerance of the transmit point, wherein waveforms having PAPR characteristics beyond the PAPR tolerance of the transmit point are excluded from the plurality of candidate waveforms.

17. The transmit point of example 14, wherein the waveform selection criteria includes a traffic characteristic of the traffic or an application type of the traffic.

18. The transmit point of example 17, wherein the instruction to select one of the plurality of candidate waveforms includes instructions to: determine, in accordance with the traffic characteristic or application type, whether grant-based access or grant-less access is better suited for transporting the traffic; select one of the plurality of candidate waveforms that offers grant-less access in response to determining that grant-less access is better suited for transporting the traffic; and select one of the plurality of candidate waveforms that offers grant-based access in response to determining that grant-based access is better suited for transporting the traffic.

19. The transmit point of example 18, wherein waveforms offering grant-based access require that scheduling information be communicated to the receiving device before communicating the traffic, and wherein waveforms offering grant-less access do not require that scheduling information be communicated to the receiving device before communicating the traffic.

20. An apparatus includes: a processor; and a computer readable storage medium storing programming for execution by the processor, the programming including instructions to: receive, from a transmit point, a grant request for communicating traffic in a channel of a wireless network; establish a wireless link in the channel; identify a plurality of candidate waveforms in accordance with a capability of the transmit point; select one of the plurality of candidate waveforms in accordance with a traffic characteristic of the traffic; send a grant response identifying the selected candidate waveform; and receive, from the transmit point, a transmission carried by the selected candidate waveform, the transmission comprising the traffic.

21. The apparatus of example 20, wherein the instruction to identify the plurality of candidate waveforms in accordance with the capability of the transmit point includes instructions to: determine a Peak-to-Average-Power-Ratio (PAPR) tolerance of the transmit point; and identify candidate waveforms, out of a plurality of possible waveforms, having PAPR characteristics within the PAPR tolerance of the transmit point, wherein waveforms having PAPR characteristics beyond the PAPR tolerance of the transmit point are excluded from the plurality of candidate waveforms.

22. A wireless device includes: a processor; and a computer readable storage medium storing programming for execution by the processor, the programming including instructions to: determine, in accordance with a waveform selection criteria of traffic, that grant-less access is better suited for transporting the traffic than grant-based access, wherein the traffic comprises at least some data that is not classified as signaling or control information; and transmit the traffic in a resource of a wireless channel that is reserved for grant-less waveforms, wherein the wireless channel comprises other resources reserved for grant-based waveforms.

23. A receiving device includes: a processor; and a computer readable storage medium storing programming for execution by the processor, the programming including instructions to: receive a first plurality of data transmissions of a first waveform type via a channel; and receive a second plurality of data transmissions of a second waveform type that is different than the first waveform type via a channel, wherein the second plurality of data transmissions are received over different time-frequency resources of the channel than the first plurality of data transmissions, and wherein the first plurality of data transmissions and the second plurality of data transmissions comprise at least some data that is not classified as signaling or control information.

24. The receiving device of example 23, wherein the programming further comprises instructions to: assign a first frequency band to carry the first waveform before the first plurality of data transmissions are received; and re-assign the first frequency band to carry the second waveform after the first plurality of data transmissions are received, wherein the first waveform and the second waveform are separated in the time domain or the spatial domain, wherein the first plurality of data transmissions are received over the first frequency band prior to the second plurality of data transmissions are received over the first frequency band.

25. The receiving device of example 23, wherein the first waveform is orthogonal and the second waveform is non-orthogonal.

26. The receiving device of example 23, wherein the first waveform offers grant-less access and the second waveform offers grant-based access.

27. A transmit point includes: a processor; and a computer readable storage medium storing programming for execution by the processor, the programming including instructions to: transmit a first data transmission using a first waveform type in a channel; and transmit a second data transmission using a second waveform type that is different than the first waveform type in the channel, wherein the second data transmission is transmitted over different resources of the channel than the first data transmission, and wherein the first data transmission and the second data transmission comprise at least some data that is not classified as signaling or control information.

28. The transmit point of example 27, wherein the programming further comprises instructions to: assign a first frequency band to carry the first waveform before transmitting the first data transmission; and re-assign the first frequency band to carry the second waveform after transmitting the first data transmission, wherein the first waveform and the second waveform are separated in the time domain or the spatial domain, and wherein the first data transmission is transmitted over the first frequency band prior to the data transmission being transmitted over the first frequency band.

29. The transmit point of example 27, wherein the first waveform is orthogonal and the second waveform is non-orthogonal.

30. The transmit point of example 27, wherein the first waveform offers grant-less access and the second waveform offers grant-based access.

What is claimed is:

1. A method of waveform adaptation, the method comprising:
   establishing, by a user equipment (UE), an uplink wireless link between the UE and a base station;
   after the establishing the uplink wireless link, receiving, by the UE from the base station, a first indication indicating a first waveform from a plurality of candidate waveforms for a first data transmission and a second indication indicating a second waveform from the plurality of candidate waveforms for a second data transmission; and
   transmitting, by the UE to the base station, the first data transmission using the first waveform and the second data transmission using the second waveform over the uplink wireless link within one serving cell, the first waveform being different than the second waveform, wherein each of the first waveform and the second waveform is scheduled semi-statically or dynamically, the first data transmission and the second data transmission are transmitted in different time frequency resources of the uplink wireless link, the first indication further comprises a first frequency band assignment to assign a first frequency band to carry the first waveform, and the second indication further comprises a second frequency band assignment to assign a second frequency band to carry the second waveform.

2. The method of claim 1, wherein the UE is capable of communicating data over the uplink wireless link between the UE and the base station using the plurality of candidate waveforms.

3. The method of claim 2, further comprising identifying the plurality of candidate waveforms, out of a plurality of possible waveforms, that are both capable of being transmitted by the UE and capable of being received by the base station.

4. The method of claim 3, wherei identifying the plurality of candidate waveforms is performed statically upon establishing the uplink wireless link, and
   wherein selecting one of the plurality of candidate waveforms in accordance with a waveform selection criteria is performed dynamically in accordance with a dynamic waveform adaptation period.

5. The method of claim 2, wherein the first waveform is selected from the plurality of candidate waveforms in accordance with a waveform selection criteria, and the waveform selection criteria includes a traffic characteristic or an application type of the first data transmission and the second data transmission.

6. The method of claim 5, wherein the waveform selection criteria includes a spectrum localization requirement.

7. The method of claim 5, wherein the waveform selection criteria includes an adjacent channel interference rejection requirement.

8. The method of claim 2, wherein the first waveform is selected from the plurality of candidate waveforms in accordance with a waveform selection criteria and the waveform selection criteria includes a Peak-to-Average-Power-Ratio (PAPR) tolerance of the UE.

9. The method of claim 2, wherein the first waveform is selected from the plurality of candidate waveforms in accordance with a waveform selection criteria and the waveform selection criteria includes a number of data streams that are to be communicated in the first data transmission and a number of data streams that are to be communicated in the second data transmission.

10. The method of claim 2, wherein the first waveform is selected from the plurality of candidate waveforms in accordance with a waveform selection criteria and the waveform selection criteria includes an operational frequency band of the UE or the base station.

11. The method of claim 1, wherein the first data transmission and the second data transmission are transmitted by UE to the base station over different frequency bands.

12. The method of claim 1, wherein the first data transmission is transmitted by the UE to the base station using a grant-based access technique and the second data transmission is transmitted by the UE to the base station using a grant-free access technique.

13. The method of claim 12, wherein the grant-based access technique used for the first data transmission requires the base station to communicate grant information for the first date transmission to the UE prior to the transmitting the first data transmission by the UE over the uplink wireless link, and
   wherein the grant-less access technique used for the second data transmission is without requiring the base station to communicate grant information to the UE prior to the transmitting the second data transmission by the UE over the uplink wireless link.

14. The method of claim 1, wherein the first data transmission is transmitted by the UE to the base station using an orthogonal waveform and the second data transmission is transmitted by the UE to the base station using a non-orthogonal waveform.

15. The method of claim 1, further comprising:
   receiving, by the UE, a re-assignment indication to re-assign the first frequency band to carry the second waveform after the transmitting the first data transmission, wherein the first waveform and the second waveform are separated in the time domain or in the spatial domain.

16. An apparatus comprising:
   a processor; and
   a computer readable storage medium storing programming for execution by the processor, the programming including instructions to:
      establish an uplink wireless link between the apparatus and a base station;
      after the uplink wireless link is established, receive, from the base station, a first indication indicating a first waveform from a plurality of candidate waveforms for a first data transmission and a second indication indicating a second waveform from the plurality of candidate waveforms for a second data transmission; and
      transmit, to the base station, the first data transmission using the first waveform and the second data transmission using the second waveform over the uplink wireless link within one serving cell, the first waveform being different than the second waveform, wherein each of the first waveform and the second waveform is scheduled semi-statically or dynamically, the first data transmission and the second data transmission are transmitted in different time frequency resources of the uplink wireless link, the first indication further comprises a first frequency band assignment to assign a first frequency band to carry the first waveform, and the second indication further comprises a second frequency band assignment to assign a second frequency band to carry the second waveform.

17. The apparatus of claim 16, wherein the apparatus is capable of communicating data over the uplink wireless link between the apparatus and the base station using the plurality of candidate waveforms.

18. The apparatus of claim 17, wherein the programming further includes instructions to identify the plurality of candidate waveforms, out of a plurality of possible waveforms, that are both capable of being transmitted by the apparatus and capable of being received by the base station.

19. The apparatus of claim 17, wherein the programming further includes instructions to select the first waveform and the second waveform according to waveform selection criteria, the waveform selection criteria including a traffic characteristic or an application type of the first data transmission and the second data transmission, a spectrum localization requirement, an adjacent channel interference rejection requirement, or a combination thereof.

20. The apparatus of claim 17, wherein the first data transmission and the second data transmission are transmitted by the apparatus to the base station over different frequency bands.

21. The apparatus of claim 17, wherein the first data transmission is transmitted by the apparatus to the base station using a grant-based access technique and the second data transmission is transmitted by the apparatus to the base station using a grant-less access technique.

22. The apparatus of claim 21, wherein the grant-based access technique used for the first data transmission requires the base station to communicate grant information for the first date transmission to the apparatus prior to the first data transmission being transmitted by the apparatus over the uplink wireless link, and
wherein the grant-less access technique used for the second data transmission is without requiring the base station to communicate grant information to the apparatus prior to the second data transmission being transmitted by the apparatus over the uplink wireless link.

23. The apparatus of claim 17, wherein the first data transmission is transmitted by the apparatus to the base station using an orthogonal waveform and the second data transmission is transmitted by the apparatus to the base station using a non-orthogonal waveform.

24. The apparatus of claim 17, wherein the programming further includes instructions to select the first waveform and the second waveform according to waveform selection criteria, the waveform selection criteria including a Peak-to-Average-Power-Ratio (PAPR) tolerance of the apparatus.

25. The apparatus of claim 17, wherein the programming further includes instructions to select the first waveform and the second waveform according to waveform selection criteria, the waveform selection criteria including a number of data streams that are to be communicated in the first data transmission and a number of data streams that are to be communicated in the second data transmission.

26. The apparatus of claim 17, wherein the programming further includes instructions to select the first waveform and the second waveform according to waveform selection criteria, the waveform selection criteria including an operational frequency band of the apparatus or the base station.

27. The apparatus of claim 16, the programming further including instructions to:
receive a re-assignment indication to re-assign the first frequency band to carry the second waveform after the first data transmission is transmitted, wherein the first waveform and the second waveform are separated in the time domain or in the spatial domain.

28. A method of waveform adaptation, the method comprising:
establishing, by a base station, an uplink wireless link between a user equipment (UE) and the base station;
after the establishing the uplink wireless link, sending, by the base station, a first indication to the UE indicating a first waveform from a plurality of candidate waveforms for a first data transmission and a second indication indicating a second waveform from the plurality of candidate waveforms for a second data transmission; and
receiving, by the base station, the first data transmission using the first waveform and the second data transmission using the second waveform over the uplink wireless link within one serving cell, the first waveform being different than the second waveform, wherein each of the first waveform and the second waveform is scheduled semi-statically or dynamically, the first data transmission and the second data transmission are transmitted in different time frequency resources of the uplink wireless link, the first indication further comprises a first frequency band assignment to assign a first frequency band to carry the first waveform, and the second indication further comprises a second frequency band assignment to assign a second frequency band to carry the second waveform.

29. The method of claim 28, wherein the first waveform has higher PAPR than the second waveform.

30. The method of claim 28, further comprising:
sending, by the base station, a re-assignment indication to re-assign the first frequency band to carry the second waveform after the receiving the first data transmission, wherein the first waveform and the second waveform are separated in the time domain or in the spatial domain.

31. The method of claim 28, wherein the first data transmission is received by the base station from the UE using a grant-based access technique and the second data transmission is received by base station from the UE using a grant-less access technique.

32. The method of claim 31, wherein the grant-based access technique used for the first data transmission requires the base station to communicate grant information for the first date transmission to the UE prior to the first data transmission being received by the base station over the uplink wireless link, and
wherein the grant-less access technique used for the second data transmission is without requiring the base station to communicate grant information to the UE prior to the second data transmission being received by the base station over the uplink wireless link.

33. A network device comprising:
a processor; and
a computer readable storage medium storing programming for execution by the processor, the programming including instructions to:
establish an uplink wireless link between a user equipment (UE) and the network device;
after the uplink wireless link is established, send a first indication to the UE indicating a first waveform from a plurality of candidate waveforms for a first data transmission and a second indication indicating a second waveform from the plurality of candidate waveforms for a second data transmission; and receive the first data transmission using the first waveform and the second data transmission using the second waveform over the uplink wireless link within one serving cell, the first waveform being different than the second waveform, wherein each of the first waveform and the second waveform is scheduled semi-statically or dynamically, the first data transmission and the second data transmission are transmitted in different time frequency resources of the uplink wireless link, the first indication further comprises a first frequency band assignment to assign a first frequency band to carry the first waveform, and the second indication further comprises a second frequency band assignment to assign a second frequency band to carry the second waveform.

34. The network device of claim 33, wherein the first waveform has higher PAPR than the second waveform.

35. The network device of claim 33, the programming further including instructions to:
send a re-assignment indication to re-assign the first frequency band to carry the second waveform after the first data transmission is received, wherein the first waveform and the second waveform are separated in the time domain or in the spatial domain.

36. The network device of claim 33, wherein the first data transmission is received by the network device from the UE using a grant-based access technique and the second data transmission is received by base station from the UE using a grant-less access technique.

37. The network device of claim 36, wherein the grant-based access technique used for the first data transmission requires the network device to communicate grant information for the first date transmission to the UE prior to the first data transmission being received by the network device over the uplink wireless link, and wherein the grant-less access technique used for the second data transmission is without requiring the network device to communicate grant information to the UE prior to the second data transmission being received by the network device over the uplink wireless link.

* * * * *

UNITED STATES PATENT AND TRADEMARK OFFICE
CERTIFICATE OF CORRECTION

PATENT NO. : 10,784,984 B2
APPLICATION NO. : 15/630085
DATED : September 22, 2020
INVENTOR(S) : Alireza Bayesteh Page 1 of 1

It is certified that error appears in the above-identified patent and that said Letters Patent is hereby corrected as shown below:

In Column 11, Line 41, Claim 4, delete "wherei" and insert --wherein--.

In Column 12, Lines 10-11, Claim 11, delete "transmitted by UE" and insert --transmitted by the UE--.

In Column 12, Line 16, Claim 12, delete "grant-free" and insert --grant-less--.

Signed and Sealed this
First Day of December, 2020

Andrei Iancu
*Director of the United States Patent and Trademark Office*